(12) United States Patent
Jaenicke et al.

(10) Patent No.: US 12,467,532 B2
(45) Date of Patent: Nov. 11, 2025

(54) CRANE HAVING A CLOSED HYDRAULIC CIRCUIT

(71) Applicant: Manitowoc Crane Group France SAS, Dardilly (FR)

(72) Inventors: Thomas Jaenicke, Wiefelstede (DE); Verena Bohmann, Oldenburg (DE); Alexander Suntay, Friedeburg (DE)

(73) Assignee: Manitowoc Crane Group France SAS, Dardilly (FR)

( * ) Notice: Subject to any disclaimer, the term of this patent is extended or adjusted under 35 U.S.C. 154(b) by 0 days.

(21) Appl. No.: 16/633,946

(22) PCT Filed: Jun. 8, 2018

(86) PCT No.: PCT/EP2018/065110
§ 371 (c)(1),
(2) Date: Jan. 24, 2020

(87) PCT Pub. No.: WO2019/025058
PCT Pub. Date: Feb. 7, 2019

(65) Prior Publication Data
US 2020/0207589 A1    Jul. 2, 2020

(30) Foreign Application Priority Data

Aug. 2, 2017   (DE) ...................... 10 2017 117 505.9

(51) Int. Cl.
*F16H 61/4043*    (2010.01)
*B66C 23/00*    (2006.01)
(Continued)

(52) U.S. Cl.
CPC ......... *F16H 61/4043* (2013.01); *B66C 23/54* (2013.01); *F15B 21/047* (2013.01);
(Continued)

(58) Field of Classification Search
CPC .... B66C 23/54; F15B 21/047; F16H 61/4043; F16H 61/4061; F16H 61/4157; F16H 61/4183
See application file for complete search history.

(56) References Cited

U.S. PATENT DOCUMENTS 4,552,503 A    11/1985  Mouri et al.
4,571,940 A  *  2/1986  Wuchenauer ......... F16H 61/431
                                                          60/443
(Continued)

FOREIGN PATENT DOCUMENTS

CN    101062752 A    10/2007
CN    101861437 A    10/2010
(Continued)

OTHER PUBLICATIONS

Machine translation of DE-10317659-A1 (Year: 2004).*
(Continued)

*Primary Examiner* — Matthew Wiblin
(74) *Attorney, Agent, or Firm* — Cook Alex Ltd.

(57) ABSTRACT

A crane, in particular a mobile crane, having a closed hydraulic circuit in which a hydraulic pump is hydraulically connected to at least one hydraulic motor via a feed and a discharge, and in which the feed is hydraulically connected to the discharge via at least one bypass which bypasses the at least one hydraulic motor, wherein the at least one bypass includes a continuously adjustable valve for variably controlling the fluid flow bypassing the at least one hydraulic motor. In addition, a corresponding control device and a corresponding crane control program for actuating a closed hydraulic circuit of a crane are provided.

18 Claims, 1 Drawing Sheet

(51) Int. Cl.
  *F15B 21/047* (2019.01)
  *F16H 61/4061* (2010.01)
  *F16H 61/4157* (2010.01)
  *F16H 61/4183* (2010.01)
  *F15B 11/04* (2006.01)

(52) U.S. Cl.
  CPC ..... *F16H 61/4157* (2013.01); *F16H 61/4183* (2013.01); *F15B 11/0406* (2013.01); *F15B 2211/20546* (2013.01); *F15B 2211/415* (2013.01); *F16H 61/4061* (2013.01)

(56) References Cited

U.S. PATENT DOCUMENTS

| | | | | |
|---|---|---|---|---|
| 4,586,332 | A * | 5/1986 | Schexnayder | E02F 9/123 60/468 |
| 4,887,428 | A * | 12/1989 | Iino | F16H 61/4017 60/468 |
| 5,211,015 | A * | 5/1993 | Schroeder | F03C 1/0684 60/444 |
| 5,448,148 | A | 9/1995 | Devier | |
| 6,619,626 | B1 * | 9/2003 | Kruschinski | B66C 3/125 254/361 |
| 6,820,355 | B2 * | 11/2004 | Yoshino | E02F 9/2203 37/348 |
| 2007/0267068 | A1 * | 11/2007 | Daigre | F16H 61/4017 137/511 |
| 2013/0269329 | A1 * | 10/2013 | Vonderwell | F15B 11/0445 60/327 |

FOREIGN PATENT DOCUMENTS

| | | | | |
|---|---|---|---|---|
| CN | 203699748 | U | 7/2014 | |
| CN | 104477800 | A | 4/2015 | |
| DE | 2631529 | A1 * | 1/1978 | ............. E02F 9/128 |
| DE | 2701297 | C2 | 7/1979 | |
| DE | 3346800 | A1 | 7/1984 | |
| DE | 3519148 | A1 * | 12/1986 | ......... F16H 61/4157 |
| DE | 4405472 | A1 | 8/1995 | |
| DE | 4231637 | C2 | 10/1995 | |
| DE | 19920867 | A1 | 2/2001 | |
| DE | 10317659 | A1 * | 11/2004 | ............. E02F 9/123 |
| DE | 202007011783 | U1 | 12/2008 | |
| DE | 102006040459 | B4 | 12/2012 | |
| EP | 1175318 | B1 | 3/2005 | |
| EP | 2791427 | B1 | 8/2016 | |
| JP | 62031703 | A * | 2/1987 | ............. E02F 9/123 |
| JP | H5248537 | A | 9/1993 | |
| WO | 9105966 | A1 | 5/1991 | |

OTHER PUBLICATIONS

International Search Report issued by ISA/EP in connection with PCT/EP2018/065110 on Sep. 19, 2018.
Japanese Office Action issued in application No. 2020-505263 dated Feb. 12, 2021.
CNIPA Office Action and Search Report dated Oct. 10, 2020 issued in connection with corresponding CN Pat. Appl. 201880049791.3, and English translations.
JPO Office Action dated May 24, 2021 issued in connection with corresponding JP Pat. Appl. 2020-505263, and English translation.
Verified English translation of DE 103 17 659 A1 (Kleineisel).

* cited by examiner

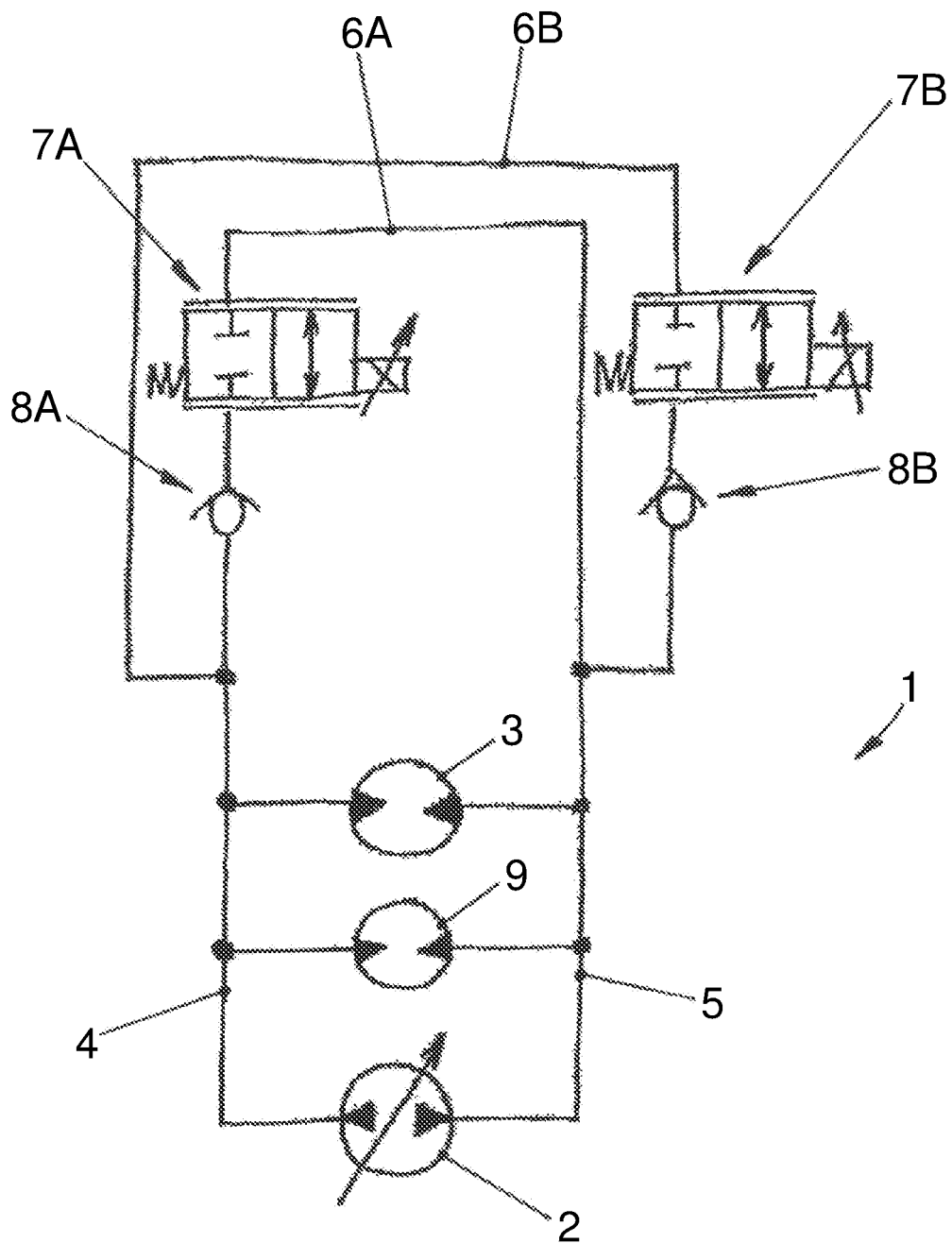

CRANE HAVING A CLOSED HYDRAULIC CIRCUIT

The present invention relates to a crane, in particular a mobile crane, having a closed hydraulic circuit in which a hydraulic pump is hydraulically connected to at least one hydraulic motor via a feed and a discharge and in which a bypass between the feed and the discharge bypasses the hydraulic motor. The present invention also relates to a corresponding control device and to a corresponding crane control program for actuating the closed hydraulic circuit.

In mobile cranes, a distinction is drawn in principle between two types of hydraulic circuits by means of which the output generated by a drive pump is relayed to the crane functions to be driven, such as for example hydraulic cylinders, winches or the slewing mechanism of the superstructure.

In smaller cranes, the slewing mechanism is often driven by an open hydraulic circuit, wherein it is possible to separately control the feed and discharge of oil. This enables a multitude of control options which allow different functions in a slewing mechanism. It is for example possible to employ a fixed displacement pump, the delivery flow of which is regulated by a valve only. As a result, different accelerating and decelerating scenarios can then be realised. One important function is so-called "coasting", using which it is possible to slew the crane superstructure out of a stationary position using exterior forces and without actively using the slewing mechanism. The crane superstructure can then for example be drawn by means of the lifting mechanism over a load to be lifted. The slewing mechanism drive is then effectively switched to a zero force, which also affords the option of allowing the slewing mechanism to peter out from a slewing movement at a low force. An experienced crane operator can then adjust the slewing mechanism to a desired speed in order to then allow the crane to peter out to the desired working point by cancelling the actuating signal, which is for example inputted via a joystick. It can then be positioned exactly by operating a brake pedal or even by renewed accelerating if it is possible to foresee that the crane will come to a stop before the desired working point. Coasting is also helpful if the crane is performing a tandem lift together with another crane. In a tandem lift, a load is lifted by two or more cranes, which consequently must operate in synchrony in their working movements. In the slewing mechanism, coasting then affords the option of one crane actively guiding the slewing movement and the other crane or cranes passively following by coasting.

A closed hydraulic circuit is primarily used to drive the slewing mechanism in larger cranes. The slewing movement is then generally controlled by an adjustable pump which controls the speed of one or more hydraulic motors, depending on the delivery flow. In this system, the simplest way to implement a switch to coasting is if a digitally switchable bypass valve generates a direct short-circuit between the feed side and the discharge side of the hydraulic motor or motors. The crane can then be freely slewed, although re-acceleration during movement without jolting is just as impossible as delicate braking.

For actuating the superstructure slewing drive, the prior-art documents DE 27 01 297 C2, DE 33 46 800 A1, DE 42 31 637 C2, DE 44 05 472 A1, DE 199 20 867 A1, EP 1 175 318 B1 and U.S. Pat. No. 5,448,148 A provide solutions involving a closed hydraulic circuit, and prior-art documents DE 10 2006 040 459 B4 and EP 2 791 427 B2 provide solutions involving an open hydraulic circuit.

It is the object of the present invention to provide a closed hydraulic circuit for a crane, which enables delicate braking and the re-acceleration of hydraulic motors. This object is realised by the subject-matter of co-ordinated patent claims 1, 9 and 10, wherein the sub-claims define preferred embodiments of the present invention.

A crane, in particular a mobile crane, having a closed hydraulic circuit in which a hydraulic pump is hydraulically connected to at least one hydraulic motor via a feed and a discharge, and in which the feed is hydraulically connected to the discharge via at least one bypass which bypasses the at least one hydraulic motor, is provided in accordance with the invention, wherein the at least one bypass comprises a continuously adjustable valve for variably controlling the fluid flow bypassing the at least one hydraulic motor.

In other words, the at least one bypass which short-circuits the feed to the discharge comprises a proportionally switching valve which non-incrementally opens and/or closes the bypass in accordance with a control signal, such that the fluid flow passing through the bypass can consequently likewise be non-incrementally varied. This enables very delicate movements, accelerations and delays to the crane functions driven via the relevant hydraulic circuit. This is particularly desirable for the slewing mechanism of the crane, via which the crane superstructure which comprises the jib and which is rotatably mounted on the crane undercarriage and/or bogie is pivoted rotationally about a vertical axis.

In accordance with a preferred embodiment of the present invention, the at least one bypass comprises a closing valve which is configured to close the bypass to the fluid flow in at least one flowing direction, in particular automatically. Such a closing valve, provided in addition to the continuously adjustable valve, can for example be connected such that it closes the bypass to the fluid flow as soon as the fluid flow would flow through the bypass in an undesirable opposite direction.

The hydraulic circuit in accordance with the invention preferably comprises two bypasses which are connected in parallel and hydraulically connect the feed to the discharge, wherein each bypass is provided for variably controlling the fluid flow for one of the two slewing directions of the at least one hydraulic motor, wherein each bypass can comprise at least one continuously adjustable valve and at least one closing valve by means of which the fluid flows provided for the two slewing directions can be non-incrementally varied and/or closed.

In other words, a bypass is responsible for exactly one slewing direction of the hydraulic motor or motors, wherein a fluid flow through the bypasses in the respectively opposite direction can be prevented by the closing valve.

The at least one continuously adjustable valve is preferably a proportional valve, in particular an electrically operated proportional valve. A regulating valve or servo valve would however also be equally conceivable for variably controlling the fluid flow flowing through the relevant bypass.

Although any closing valve which is suitable for sealing the bypass is conceivable in principle, another preferred embodiment of the present invention uses an automatically sealing unidirectional valve as the valve which seals the bypass. The hydraulic liquid is thus automatically prevented from flowing through the bypass in an undesirable opposite direction. If two bypasses are connected in parallel, said unidirectional valves can be connected in opposite directions, such that the fluid flow automatically flows through each of the two bypasses during a movement of the hydraulic motor in exactly one slewing direction.

It is also possible for the delivery flow of the hydraulic pump to be able to be variably adjusted and in particular regulated by means of an electrical proportional regulator (EP regulator). This enables a co-operation between the continuously adjustable valve or valves and the hydraulic pump to be achieved by means of suitable actuation, which enables extremely delicate movements, accelerations and delays to the crane functions driven via the hydraulic circuit, in particular the hydraulic circuit of a slewing mechanism. In particular, this also enables renewed accelerating from a coasting state of the hydraulic circuit.

It is also conceivable for the volumetric displacement of at least one hydraulic motor to be able to be variably adjusted and in particular regulated, such that a gentle "handling" of the crane functions driven via the hydraulic circuit is enabled by means of suitable actuation.

In accordance with another preferred embodiment of the present invention, the crane also comprises a control device which is in contact with the hydraulic pump and the at least one continuously adjustable valve via at least one interface and is configured to actuate the hydraulic pump and the at least one continuously adjustable valve during crane operations in a co-ordinated way. In other words, the control device actuates the hydraulic pump, the at least one continuously adjustable valve and possibly even a hydraulic motor in such a way that a gentle "handling" of the crane functions driven by the closed hydraulic circuit is enabled.

Another aspect of the present invention relates to such a control device for actuating a closed hydraulic circuit of a crane, in particular a mobile crane. Although such a control device can be part of the crane in accordance with the invention which has been described above, it can also be regarded as an independent invention, wherein the control device is connected to the variably adjustable hydraulic pump and to the at least one continuously (non-incrementally) adjustable valve via respective interfaces and is configured to actuate the hydraulic pump and the at least one continuously adjustable valve during crane operations in a co-ordinated way, so as to enable delicate movements, accelerations and delays to crane functions, in particular crane functions of the slewing mechanism of the crane.

Another aspect of the present invention relates to a corresponding crane control program for actuating a closed hydraulic circuit of a crane, in particular a mobile crane, in one of the embodiments described above. Such a crane control program can for example be a software-based regulator and/or controller which runs on the control device described above and enables the hydraulic pump and the at least one continuously adjustable valve to be actuated in a co-ordinated way.

If the volumetric displacement of at least one of the hydraulic motors is able to be variably adjusted and/or regulated, the control device and/or crane control program is also configured to actuate and/or regulate said at least one hydraulic motor in co-operation with the hydraulic pump and the at least one continuously adjustable valve in a co-ordinated way.

In the following, a preferred embodiment of the present invention is described in more detail by referring to the enclosed figure. The invention can comprise any of the features described here, individually and in any expedient combination.

FIG. 1 shows a hydraulic circuit diagram of a closed hydraulic circuit 1 of a crane, in which two hydraulic motors 3, 9 can be supported on the regulatable hydraulic pump 2 both via their shared feed 4 and via their shared discharge 5. It should be noted at this juncture that if the slewing direction of the motors 3, 9 is reversed, the feed 4 performs the function of the discharge, while the discharge 5 performs the function of the feed 4.

In addition to the hydraulic motors 3, 9 which are connected in parallel, the circuit 1 comprises two bypasses 6A, 6B in opposite directions, which are connected in parallel and bypass the two motors 3, 9. The hydraulic fluid can only flow anti-clockwise through the bypass 6A due to the unidirectional valve 8A and only clockwise through the bypass 6B due to the unidirectional valve 8B. Each of the bypasses 6A, 6B is thus responsible for exactly one slewing direction of the slewing mechanism of the crane (not shown), and the hydraulic fluid flows through it as soon as the proportional valve 7A, 7B assigned to it is opened. As can be seen in FIG. 1, the proportional valves 7A, 7B are held in their closed base position by means of a spring and can be non-incrementally opened by means of an operating member which is not indicated in greater detail. The valves can however also be designed inversely, i.e. opened when there is no flow and then proportionally closed. Depending on the degree to which the respective proportional valve 7A, 7B is open, a portion of the hydraulic fluid will flow through the relevant bypass 6A, 6B and will consequently not be available to drive the motors 3, 9.

In the following, different operational states of the hydraulic circuit shown in FIG. 1 are described in more detail.

In an open hydraulic circuit 1, when the joystick is moved, the proportional valve 7A (and/or 7B) assigned to the slewing direction is opened, wherein the hydraulic pump 2 which is configured as an axial piston pump increases the volumetric flow of hydraulic fluid by pivoting out, and the slewing mechanism accelerates as in known closed circuits. Hydraulic fluid does not flow through the proportional valve 7A (and/or 7B), since the higher pressure in the feed 4 acts to close the unidirectional valve 8A.

When coasting, the proportional valve 7A continues to be open, whereupon the hydraulic pump 2 pivots in and thus reduces the volumetric flow of hydraulic fluid delivered. The load side of the hydraulic motors 3, 9 changes, and circumferential coasting arises, similar to the coasting in previous closed circuits. When controlled in the opposite direction, the proportional valve 7A (and/or 7B) is closed using a ramp function, which increases the pressure in the discharge 5. This ramp function can be controlled or regulated. Once the resting position has been reached, the proportional valve 7B (and/or 7A) of the opposing bypass 6B (and/or 6A) is opened, and the hydraulic pump 2 drives in the other slewing direction. The crane accelerates in the opposite direction.

The brake pedal (not shown) is coupled to the two valves 7A, 7B, wherein slewing direction recognition defines which of the valves 7A, 7B is to be operated. The corresponding proportional valve 7A, 7B is proportionally closed, and the pump is pivoted in, which reduces the volumetric flow of hydraulic fluid delivered. The braking pressure increases, and the slewing mechanism slows. In order to re-accelerate, the proportional valve 7A, 7B is controlled to open and the hydraulic pump 2 is pivoted out (increasing the volumetric flow). As soon as the driving load pressure is higher than the pressure in the respective discharge 5, the unidirectional valve 8A, 8B closes.

What is claimed is:

1. A crane having a closed hydraulic circuit in which a hydraulic pump is hydraulically connected to at least one hydraulic motor via a feed and a discharge to provide fluid flow delivered to the at least one hydraulic motor, and in which the feed is hydraulically connected to the discharge via at least one bypass which bypasses the at least one hydraulic motor, wherein the at least one bypass comprises a continuously adjustable proportional valve, which is adapted to be proportionally opened and closed so as to variably control a fluid flow in the at least one bypass the continuously adjustable proportional valve being operatively coupled to an operator control member, and
    a control device which is in contact with the hydraulic pump and the at least one continuously adjustable proportional valve via at least one interface and is configured to actuate the hydraulic pump and the at least one continuously adjustable proportional valve during crane operations in a co-ordinated way,
wherein the control device is configured to initiate:
    an acceleration of the at least one hydraulic motor by actuating the hydraulic pump to provide the fluid flow delivered to the hydraulic motor at a pressure that is higher than a pressure of a fluid flow received at the hydraulic pump from the at least one hydraulic motor;
    a coasting state of the at least one hydraulic motor by actuating the at least one continuously adjustable proportional valve to open, and by actuating the hydraulic pump to reduce the fluid flow delivered to the hydraulic motor, wherein a fluid flow delivered from the at least one hydraulic motor is directed through the at least one bypass; and
    deceleration initiated by a valve-controlled deceleration of the at least one hydraulic motor in the coasting state by actuating the at least one continuously adjustable proportional valve to proportionally close, wherein the continuously adjustable proportional valve is directly controlled by the operator control member to cause deceleration by causing a fluid flow received at the hydraulic motor from the at least one continuously adjustable proportional valve to be maintained at a lower pressure than the fluid flow delivered from the at least one hydraulic motor to the at least one continuously adjustable proportional valve.

2. The crane according to claim 1, wherein the at least one bypass comprises a closing valve which is configured to close the bypass to the fluid flow in at least one flowing direction.

3. The crane according to claim 2, wherein the at least one closing valve is a unidirectional valve.

4. The crane according to claim 1, wherein the at least one bypass comprises two bypasses such that the feed is hydraulically connected to the discharge via the two bypasses, wherein the two bypasses are connected in parallel and respectively comprise the continuously adjustable proportional valve and a closing valve for variably controlling the fluid flow in the at least one bypass for opposing slewing directions of the at least one hydraulic motor.

5. The crane according to claim 1, wherein the flow delivered to the hydraulic motor by the hydraulic pump is able to be variably adjusted.

6. The crane according to claim 1, wherein a volumetric displacement of the at least one hydraulic motor is able to be variably adjusted.

7. The crane of claim 1, wherein the operator control member is a brake pedal.

8. The crane of claim 1, wherein the operator control member is a joystick.

9. A control device for actuating a closed hydraulic circuit of a crane, the hydraulic circuit having a hydraulic pump hydraulically connected to at least one hydraulic motor via a feed and a discharge to provide a fluid flow delivered to the at least one hydraulic motor, and in which the feed is hydraulically connected to the discharge via at least one bypass which bypasses the at least one hydraulic motor, wherein the at least one bypass comprises a continuously adjustable proportional valve, the continuously adjustable proportional valve being operatively coupled to an operator control member,
wherein the control device is in contact with the hydraulic pump and the at least one continuously adjustable proportional valve via at least one interface, and
wherein the control device is configured to initiate:
    an acceleration of the at least one hydraulic motor by actuating the hydraulic pump to provide the fluid flow delivered to the hydraulic motor at a pressure that is higher than a pressure of a fluid flow received at the hydraulic pump from the at least one hydraulic motor;
    a coasting state of the at least one hydraulic motor by actuating the at least one continuously adjustable proportional valve to open, and by actuating the hydraulic pump to reduce the fluid flow delivered to the at least one hydraulic motor,
wherein a fluid flow delivered from the at least one hydraulic motor is directed through the at least one bypass; and
    deceleration initiated by a valve-controlled deceleration of the at least one hydraulic motor in the coasting state by actuating the at least one continuously adjustable proportional valve to proportionally close, wherein the continuously adjustable proportional valve is directly controlled by the operator control member to cause deceleration such that a fluid flow received at the at least one hydraulic motor from the at least one continuously adjustable proportional valve is maintained at a lower pressure than the fluid flow delivered from the at least one hydraulic motor to the at least one continuously adjustable proportional valve.

10. The control device of claim 9, wherein the operator control member is a brake pedal.

11. The control device of claim 9, wherein the operator control member is a joystick.

12. A crane having a closed hydraulic circuit comprising:
a hydraulic pump hydraulically connected to at least one hydraulic motor via a feed and a discharge to deliver a fluid to the at least one hydraulic motor;
a first bypass hydraulically connecting the feed to the discharge;
a first proportional valve arranged in the first bypass being operatively coupled to
an operator control member;
a second bypass hydraulically connecting to the feed to the discharge; and
a second proportional valve arranged in the second bypass being operatively coupled to the operator control member,
a control device which is in contact with the hydraulic pump and the first and second proportional valves via at least one interface and is configured to actuate the hydraulic pump and the first and second proportional valves during crane operations in a coordinated way;
wherein the at least one hydraulic motor is operable in an acceleration state for a first slewing direction and a second slewing direction and in a coasting state for the first slewing direction and the second slewing direction, wherein the control device is configured to initiate the acceleration state and the coasting state;

wherein in the acceleration state for the first slewing direction, the hydraulic pump is configured to deliver the fluid to the at least one hydraulic motor at a first volumetric flow, the first proportional valve is open, the second proportional valve is closed, and wherein the fluid in the feed is at a higher pressure than the fluid in the discharge, and wherein in the coasting state for the first slewing direction, the hydraulic pump is configured to deliver the fluid to the at least one hydraulic motor at a second volumetric flow less than the first volumetric flow, the first proportional valve is open, the second proportional valve is closed, and the fluid is directed into the first bypass in a first flow direction, wherein to initiate deceleration during the coasting state, the first proportional valve is directly controlled by the operator control member and is proportionally closed so as to variably reduce a fluid flow in the first bypass to decelerate the at least one hydraulic motor, and the fluid in the discharge to be maintained at a higher pressure than the fluid in the feed.

13. The crane of claim 12, further comprising a first closing valve arranged in the first bypass, wherein in the acceleration state for the first slewing direction, the first closing valve is closed to prevent the fluid flow through the first proportional valve in a second flow direction opposite to the first flow direction.

14. The crane of claim 13, wherein in the coasting state for the first slewing direction, the first closing valve is open to permit the fluid flow through the first bypass to the at least one hydraulic motor.

15. The crane of claim 12, wherein in the coasting state for the first slewing direction, the at least one hydraulic motor is further decelerated in response to the hydraulic pump delivering the fluid flow to the at least one hydraulic motor at the second volumetric flow.

16. The crane of claim 12, wherein in the acceleration state for the second slewing direction, the hydraulic pump is configured to deliver the fluid to the at least one hydraulic motor at the first volumetric flow, the first proportional valve is closed, the second proportional valve is open, and the discharge is a load side of the at least one hydraulic motor, and wherein in the coasting state for the second slewing direction, the hydraulic pump is configured to deliver the fluid to the at least one hydraulic motor at the second volumetric flow less than the first volumetric flow, the first proportional valve is closed, the second proportional valve is open, the feed is the load side of the at least one hydraulic motor, and the fluid is directed into the second bypass in a second flow direction, wherein, as a consequence of an actuation of the operator control member by an operator, the second proportional valve is proportionally closed so as to variably reduce a fluid flow in the second bypass to decelerate the at least one hydraulic motor.

17. The crane of claim 12, wherein the operator control member is a brake pedal.

18. The crane of claim 12, wherein the operator control member is a joystick.

* * * * *